Feb. 3, 1948. C. SUMTER 2,435,549
BATTERY CARRIER
Filed June 22, 1944

INVENTOR.
Chester Sumter
BY
ATTORNEYS.

Patented Feb. 3, 1948

2,435,549

UNITED STATES PATENT OFFICE 2,435,549

BATTERY CARRIER

Chester Sumter, Knoxville, Tenn.

Application June 22, 1944, Serial No. 541,503

5 Claims. (Cl. 294—104)

This invention relates to improvements in package carriers.

The primary object of this invention is the provision of a carrier particularly adapted for the lifting and transportation of storage batteries.

A further object of this invention is the provision of an improved battery carrier having means to facilitate the expeditious application of the same upon the posts or walls of the storage battery so that the battery may be lifted and transported with ease.

Other objects of the invention will be apparent from the following detailed description.

In the accompanying drawing, forming a part of this specification, and wherein similar reference characters designate corresponding parts thruout the several views, Figure 1 is a perspective view of the improved battery carrier.

Figure 1:
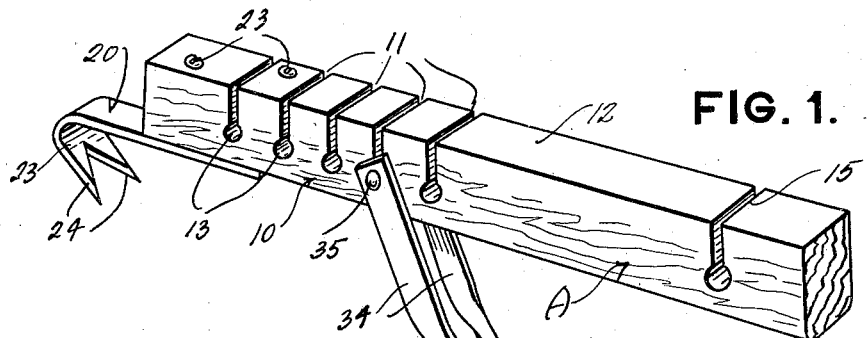

In the drawing, wherein for the purpose of illustration is shown only a preferred embodiment of the invention, the letter A may generally designate the improved battery carrier, which is adapted for the support of short and long type batteries B and C respectively.

The improved battery carrier comprises an elongated supporting member 10, preferably formed of wood altho not limited to such material. In cross section it is preferably square or polygonal altho it may be suitably shaped to conform to the hand of the user. The said supporting member 10 is provided with a series of transverse slots 11 therein opening from the upper surfaces 12 thereof and terminating short of the lower surface; said slots being extended from side to side of the supporting member. At their lower ends they have enlarged socket portions 13 for a purpose to be subsequently described. These slots 11 are to be used for receiving the jaws of the carrier for clamping short sized batteries which vary as to length. For the longer batteries C a slot 15 is provided remote from the series of slots 11; the slot 15 having all of the characteristics of the slots 11 above described.

The carrier A at one end of the elongated supporting member 12 is provided with a fixed jaw or claw 20. It has a portion 21 secured on the under surface of the carrier member 12, as by means of detachable bolts 23. The claw furthermore includes a hook-shaped battery engaging claw end 23 bifurcated to provide pointed prongs 24 defining a V-shaped post receiving slot the edges of which are of chisel-shape formation so as to grip with facility into the lead posts of the battery.

A second jaw or claw 30 is pivoted upon the supporting member 12 complementary to the claw 20. This claw 30 includes an elongated attaching portion 33 bifurcated for the major length thereof, the bifurcated portions 34 being turned in parallel relation and spaced so as to lie comfortably at each of the sides of the carrier support portion 10. The upper ends of the portions 34 receive a pivot pin 35 which is adapted to be detachably received in any of the slots 11 or 15. At its lower end the claw 30 is hooked at 37 and bifurcated to provide battery post engaging prongs 38 which are of the same formation as the prongs of the fixed claw 20. They are pointed at their extreme ends and chisel-shaped on their facing edges.

The claws 20 and 30 are preferably of metal altho not limited thereto.

Figure 2:
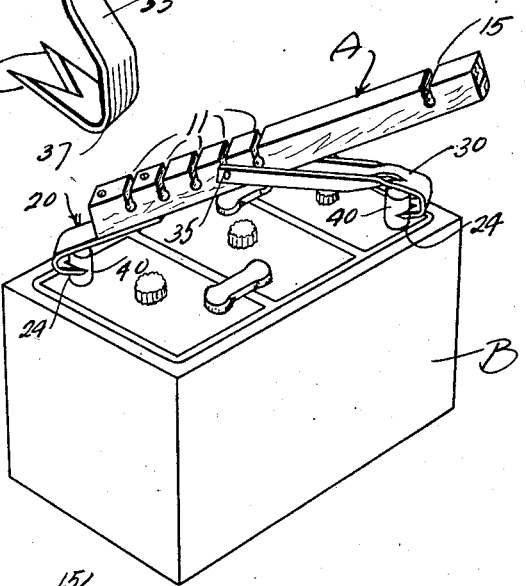
Figure 2 is a perspective view showing the application of the improved battery carrier upon a conventional short battery.

The use of the improved battery carrier will be apparent from the foregoing. As shown in Figure 2, when it is desired to grip the posts 40 of a short type battery B, the pivoted claw 30 is adjusted in the slot 11 which best suits the spacing of the posts 40. With one hand the operator can then clamp the bifurcated end of the claw 20 upon one of the posts 40 and the bifurcated end of the other claw 30 upon the other post 40 in the manner shown in Figure 2 and by grasping the outer handle portion the individual can lift the battery B with ease; the chisel-shaped edges in the sockets of the hooked ends of the claws gripping into the lead material of the posts and preventing slippage of the carrier from the posts, since the weight of the battery will cause the claws to grip the posts more firmly.

Figure 3:
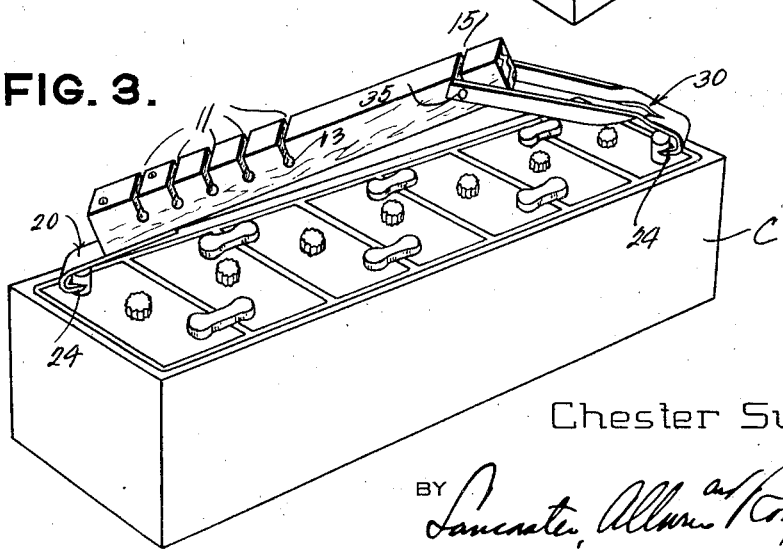
Figure 3 is a perspective view showing the application of the improved battery carrier upon a conventional long type battery.

In the use of the improved carrier for the support of longer type batteries C, such as shown in Figure 3, the pivoted claw 30 is adjusted in the slot 15. The application of the claws upon the posts of this battery C is the same as above described for the battery B, but the operator grasps the supporting portion 12 on the handle between the claws in such case.

From the foregoing it is apparent that an improved battery carrier has been provided which will facilitate the lifting and transportation of storage batteries. It is to be noted that the claw 30 is longer than the claw 20 and this facilitates the positioning of the carrier so that the individual can grasp the carrier support with ease.

Under some circumstances, when the posts of storage batteries are broken, it is rather difficult to carry the battery. With this improved carrier it is merely necessary to adjust the claw 30 of the carrier in the desired slot and the carrier can then be used with the pointed ends of the claws gripping into the side walls of the battery in a manner which will be perfectly apparent.

Various changes in the shape, size and arrangement of parts may be made to the form of invention herein shown and described, without departing from the spirit of the invention or scope of the following claims.

I claim:

1. In a battery carrying member the combination of an elongated supporting member having a series of slots transversely thereon along the length thereof, a fixed claw attached upon one end of the member, and a pivoted claw complementary to the fixed claw having means for detachable positioning in any of the slots to variably space said claws for battery gripping purposes.

2. In a battery carrying appliance the combination of an elongated supporting handle having a series of slots therein adjacent one end, a fixed claw upon said supporting member at said end of the carrier, a second claw complementary to the first claw, and means for pivoting said second claw in any of the slots above mentioned.

3. In a battery carrying appliance the combination of an elongated supporting handle having a series of slots therein adjacent one end, a fixed claw upon said supporting member at said end of the carrier, a second claw complementary to the first claw, and means for pivoting said second claw in any of the slots above mentioned, said handle having a slot therein considerably spaced from the series of slots above mentioned for the pivoted reception of the second mentioned claw to space said claws for the lifting and transportation of long batteries.

4. In a carrying appliance for lifting and carrying storage batteries and the like, the combination of an elongated rigid supporting handle having a series of transverse openings therein adjacent to one end, a fixed claw member upon said supporting handle at said end of the handle, a second claw member complementary to the first mentioned claw, and means associated with the latter for pivoting the same in any of the openings above mentioned, said handle having an openinng therein considerably spaced from the openings above mentioned for the pivotal reception of the second mentioned claw whereby to space said claws for lifting and transporting of long batteries and the like.

5. In an article carrying tool the combination of an elongated supporting handle of rigid construction, a jaw mounted adjacent to one end of the handle and extending transverse thereto for gripping an article, a second jaw having a bifurcated end provided with a transverse pivot pin, said handle having a series of spaced slots intermediate its ends opening on the upper surface thereof adapted to receive said pin for the pivoting of the bifurcated end of said jaw upon said handle.

CHESTER SUMTER.

REFERENCES CITED

The following references are of record in the file of this patent:

UNITED STATES PATENTS

| Number | Name | Date |
|---|---|---|
| 747,181 | Jackson | Dec. 15, 1903 |
| 883,820 | Menere | Apr. 7, 1908 |
| 1,451,606 | Arneson | Apr. 10, 1923 |
| 1,480,195 | Collins | Jan. 8, 1924 |
| 1,576,060 | Moss | Mar. 9, 1926 |
| 1,781,077 | Petersen | Nov. 11, 1930 |
| 1,832,409 | Mueller | Nov. 17, 1931 |
| 1,846,526 | Lormor | Feb. 23, 1932 |
| 1,849,364 | Clark | Mar. 15, 1932 |
| 2,054,708 | Nelson | Sept. 15, 1936 |
| 2,126,605 | Beery | Aug. 9, 1938 |